(12) United States Patent
Behforooz

(10) Patent No.: US 7,945,952 B1
(45) Date of Patent: May 17, 2011

(54) METHODS AND APPARATUSES FOR PRESENTING CHALLENGES TO TELL HUMANS AND COMPUTERS APART

(75) Inventor: Reza Behforooz, Seattle, WA (US)

(73) Assignee: Google Inc., Mountain View, CA (US)

( * ) Notice: Subject to any disclaimer, the term of this patent is extended or adjusted under 35 U.S.C. 154(b) by 1283 days.

(21) Appl. No.: 11/173,751

(22) Filed: Jun. 30, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. ............. 726/22; 713/155; 713/187; 726/21
(58) Field of Classification Search .................. 713/187, 713/155; 726/21, 22; 3/187, 155
See application file for complete search history.

(56) References Cited

U.S. PATENT DOCUMENTS

| | | | |
|---|---|---|---|
| 7,139,740 B2* | 11/2006 | Ayala | 706/26 |
| 7,139,916 B2* | 11/2006 | Billingsley et al. | 713/182 |
| 7,149,801 B2* | 12/2006 | Burrows et al. | 709/225 |
| 7,197,646 B2* | 3/2007 | Fritz et al. | 713/182 |
| 7,337,324 B2* | 2/2008 | Benaloh et al. | 713/182 |
| 7,360,092 B1* | 4/2008 | Peterson et al. | 713/175 |
| 7,383,570 B2* | 6/2008 | Pinkas et al. | 726/2 |
| 7,406,453 B2* | 7/2008 | Mundie et al. | 706/20 |
| 7,430,720 B2* | 9/2008 | Hua et al. | 715/753 |
| 7,457,823 B2* | 11/2008 | Shraim et al. | 707/104.1 |
| 7,505,946 B2* | 3/2009 | Chellapilla et al. | 706/11 |
| 7,533,411 B2* | 5/2009 | Goodman et al. | 726/21 |
| 7,533,419 B2* | 5/2009 | Paya et al. | 726/26 |
| 7,606,915 B1* | 10/2009 | Calinov et al. | 709/229 |
| 7,624,277 B1* | 11/2009 | Simard et al. | 713/182 |
| 7,653,944 B2* | 1/2010 | Chellapilla et al. | 726/27 |
| 7,660,993 B2* | 2/2010 | Birrell et al. | 713/178 |
| 7,725,395 B2* | 5/2010 | Rui et al. | 705/50 |
| 2003/0204569 A1* | 10/2003 | Andrews et al. | 709/206 |
| 2004/0093371 A1* | 5/2004 | Burrows et al. | 709/201 |
| 2004/0143559 A1* | 7/2004 | Ayala | 706/13 |
| 2004/0199597 A1* | 10/2004 | Libbey et al. | 709/207 |
| 2004/0254793 A1* | 12/2004 | Herley et al. | 704/270 |
| 2005/0065802 A1* | 3/2005 | Rui et al. | 705/1 |
| 2005/0066201 A1* | 3/2005 | Goodman et al. | 713/202 |
| 2005/0120201 A1* | 6/2005 | Benaloh et al. | 713/155 |

(Continued)

OTHER PUBLICATIONS

Bergmair et al., Towards Human Interactive Proofs in the Text-Domain, Using the Problem of Sense-Ambiguity for Security, 2004, Springer-Verlag.*

(Continued)

*Primary Examiner* — David García Cervetti
(74) *Attorney, Agent, or Firm* — Shumaker & Sieffert, P.A.

(57) ABSTRACT

Methods and apparatuses to tell humans and machines apart. In one embodiment, automated determination of whether a human or machine is at the other end of a communication channel is based on whether the correct response to a challenge/question is received from the other end of the communication channel. The challenge is provided in a non-image format, such as a text based questions or a sound clip, to prevent abuses of the communication system by computer software robots. The communication system may be primarily for text and/or voice communications, or be such that the rendering image-based challenges can cause significant disruption in normal flow of usage. In one example, the challenge includes deliberately generated random misspelling. In one example, the challenge is context sensitive, factual based, and/or instructive of an operation in a natural language to obtain a result.

33 Claims, 7 Drawing Sheets

U.S. PATENT DOCUMENTS

| | | | |
|---|---|---|---|
| 2005/0144067 A1* | 6/2005 | Farahat et al. | 705/14 |
| 2005/0193208 A1* | 9/2005 | Charrette et al. | 713/182 |
| 2005/0210258 A1* | 9/2005 | Birrell et al. | 713/178 |
| 2005/0229251 A1* | 10/2005 | Chellapilla et al. | 726/23 |
| 2005/0246775 A1* | 11/2005 | Chellapilla et al. | 726/22 |
| 2006/0026246 A1* | 2/2006 | Fukuhara et al. | 709/206 |
| 2006/0047766 A1* | 3/2006 | Spadea, III | 709/206 |
| 2006/0265340 A1* | 11/2006 | Ziv et al. | 705/76 |
| 2006/0286530 A1* | 12/2006 | Forrest et al. | 434/323 |
| 2007/0026372 A1* | 2/2007 | Huelsbergen | 434/322 |
| 2007/0069008 A1* | 3/2007 | Klein et al. | 235/379 |
| 2007/0174628 A1* | 7/2007 | Charrette et al. | 713/182 |
| 2007/0204043 A1* | 8/2007 | Espinosa et al. | 709/225 |
| 2007/0234423 A1* | 10/2007 | Goodman et al. | 726/21 |
| 2008/0200252 A1* | 8/2008 | Borgs et al. | 463/42 |
| 2009/0235327 A1* | 9/2009 | Jakobsson et al. | 726/2 |

OTHER PUBLICATIONS

Tsz-Yan Chan, Using a Text-to-Speech Synthesizer to generate a reverse Turing Test, 2003, IEEE.*

Mori, Greg and Malik, Jitendra "Breaking a Visual CAPTCHA" Dec. 15, 2003 Downloaded Apr. 25, 2005 from U.C. Berkeley site pp. 1-4 URL http://www.cs.berkeley.edu/~mori/gimpy/gimpy.html.

Robinson, Sara "Human or Computer? Take This Test" Dec. 10, 2002, The New York Times, Science. Downloaded Apr. 25, 2005 from U.C. Berkeley site pp. 1-4 URL http://cs.berkeley.edu/projects/vision/mori-nyt/page1.html.

Von Ahn, Luis; Blum, Manuel; Hopper, Nicholas; Langford, John; "Play the ESP Game! Telling Humans and Computers Apart (Automatically)" pp. 1-2. The CAPTCHA Project, Carnegie Mellon School of Computer Science, Downloaded May 10, 2005 from URL http://www.captcha.net Copyright 2000-2004 Carnegie Mellon University.

Von Ahn, Luis; Blum, Manuel; Langford, John; "Telling Humans and Computers Apart Automatically" pp. 1-4, Communications of the ACM, vol. 47, Issue 2, (Feb. 2004) Copyright 2004 ACM Portal Web Page showing information connected to and link to "Telling Humans and Computers Apart Automatically" pp. 1-3 Downloaded May 10, 2005 from Portal browser.

Von Ahn, Luis; Blum, Manuel; Hopper, Nicholas J.; Langford, John; "CAPTCHA: Using Hard AI Problems for Security" pp. 1-18 Carnegie Mellon University Computer Science Dept., IBM T.J. Watson Research Center, Yorktown Heights, N.Y. 2003 CiteSeer Search Engine Page showing information connected to CAPTCHA. Downloaded May 10, 2005 pp. 1-2.

Naor, Moni "Verification of a Human in the Loop or Identification via the Turing Test" pp. 1-5, Sep. 13, 1996 Dept. of Applied Mathematics and Computer Science, Weizmann Institute of Science, Rehovot 76100 Israel. CiteSeer Search Engine Page showing information connected to "Verification of a Human in the Loop or Indentification Via the Turing Test" (1996). Downloaded May 10, 2005 pp. 1-2.

* cited by examiner

METHODS AND APPARATUSES FOR PRESENTING CHALLENGES TO TELL HUMANS AND COMPUTERS APART

TECHNOLOGY FIELD

At least some embodiments of the present invention relate to communication systems, and more particularly to the prevention of abuses of communication systems through performing automated tests to tell humans and computers apart.

BACKGROUND

CAPTCHA™, which stands for Completely Automated Public Turing tests to tell Computers and Humans Apart, are tests designed such that most humans can pass but not current computer programs.

Automated computer programs, known as "robots" or "bots", have been used to process data with minimum human intervention. While bots can be useful in certain situations, bots may lead to abuses and/or security threats in other situations.

For example, students at Carnegie Mellon University and Massachusetts Institute of Technology (MIT) have wrote bots to automatically generate votes for an online poll asking which was the best graduate school in computer science, turning the online poll into a contest between voting bots.

For example, free email services have suffered bot attacks which sign up thousands of email accounts every minute. The accounts were then used as a launch pad for sending millions of unsolicited email messages.

The School of Computer Science at Carnegie Mellon University has the CAPTCHA™ project funded by the National Science Foundation (NSF) Aladdin Center. CAPTCHA™ tests may be used to prevent search engine bots from indexing certain web pages and prevent others from finding them easily. CAPTCHA™ tests may be used to prevent dictionary attacks in password systems. A few companies are marketing the idea of using CAPTCHA™ tests to fight email worms and spam through enforcing "I will only accept an email if I know there is a human behind the other computer."

Scientist Alan Turing pioneered the concept of Turing test such that computers can be considered intelligent when they can fool a human into thinking they were having a typed conversation with another person rather than a machine.

A CAPTCHA™ test is a Turing test but designed to automatically tell human and machine apart based on the difference in capabilities between humans and the current state of art of computer programs. CAPTCHA™ tests are generated automatically and designed to be Public Turing tests which rely on randomness in the generation of the tests but neither on secret database nor on secret algorithm.

A typical CAPTCHA™ test presents a word rendered as an image. The word is distorted in shape and obfuscated with different colors and other features such as dots and lines. Most humans can pass the test, but blind and partially sighted people became the inadvertent victims in a war against bots of spammers when such CAPTCHA™ tests are used.

SUMMARY OF THE DESCRIPTION

In one aspect of an embodiment of the present invention, a method performed by a data processing system, includes: detecting a condition indicative of abuses of a communication channel; in response to the condition, providing a non-image based challenge through the communication channel, the challenge being solvable to an average human user of the communication channel; receiving a response to the challenge; and determining whether or not the response is correct.

DETAILED DESCRIPTION

One embodiment of the present invention involves the automated determination of whether a human or machine is at the other end of a communication channel. The determination is based on whether the correct response to a challenge is received from the other end of the communication channel. In one embodiment, the challenge is provided in a non-image format, such as a text based questions or a sound clip. A challenge in an image format can also be used when appropriate.

Image-based challenges have a number of limitations, such as requiring the human user to have a device capable of rendering images, requiring the human user to have adequate vision to see the image, etc. According to one embodiment of the present invention, text based challenges or sound based challenges can be used more advantageously with applications such as instant messaging (IM), short message service (SMS) messaging, telephonic communication, etc., which might not render images or might disrupt normal usage when rendering image-based challenges.

For example, the computer can play a sound clip and ask the user to type in the word or number they just heard or an answer related to the content of the sound clip. Sound based challenges are great for visually impaired users and for telephone based applications.

For example, the computer can provide text based challenges based on the idea that users can more easily answer questions like "what is the third word in this sentence?", "spell the fifth word in this sentence in reverse?", "is New York City in Africa?", "are apples squares?", etc.

In one embodiment of the present invention, the computer may deliberately misspell words, such as taking out vowels randomly, to confuse the computer software robots (bots).

In one embodiment, the challenges are used after a configurable amount of traffic (e.g., instant messages or SMS messages), or a configurable messaging speed is detected, to prevent bots from sending unsolicited messages automatically to people.

Environment/System

Figure 1:
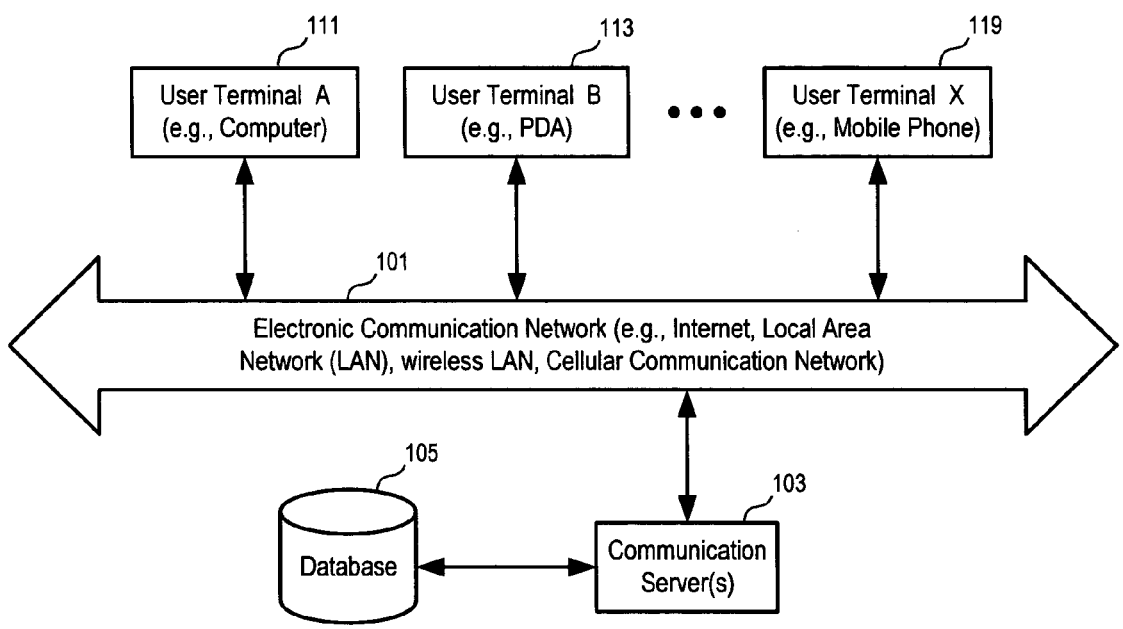
FIG. 1 illustrates a communication system to present challenges to tell humans and machines apart according to one embodiment of the present invention.

FIG. 1 illustrates a communication system to present challenges to tell humans and machines apart according to one embodiment of the present invention.

In FIG. 1, a communication server(s) (103) is used to provide communication channels over the electronic communication network (101) between user terminals, such as user terminal A (111) (e.g., computer), user terminal B (113) (e.g., personal digital assistant (PDA)), user terminal X (119) (e.g., mobile phone), etc.

The communication channels can be for real time communications, such as instant messaging (IM), telephone conversation, video conferencing, resource sharing, or other types of communications, such as emails, SMS messages, etc.

The user terminals may use the communication server(s) (103) to access other types of servers, such as search engines that are in response to queries in the form of SMS messages, document search engine, web-based email, web servers that accept and publish user comments (e.g., blogs), web based registration or form submission, etc.

The communication server(s) (103) is connected to a database (105) which contains user information and data for the generation of challenges to tell humans and machines apart. The communication server(s) (103) may be on a single physical machine or on separated, different physical machines.

The electronic communication network (101) may be the Internet, a local area network (LAN), a wireless LAN, a cellular communication network, etc., or a combination of various different types of networks with bridges, routers, gateways, etc.

In one embodiment, the user terminals may use various applications to communicate with the communication server(s) (103).

For example, the server(s) (103) may include a document server; and the user terminals run document browsers to communicate with the document server in order to access various services, such as online account log in, online registration, HTML (Hypertext Markup Language) form submission, etc. The document server provides a document to the client in response to a request for the document from the client. Using a document browser, the user can further provide data to the document server based on the document to request a further document (e.g., a web page).

For example, the server(s) (103) may include an instant messaging server, which services online presence information about IM users and which may or may not relay the IM messages for the users.

For example, the servers (103) may include a gateway for voice over interne protocol (VoIP) for the user terminals to make voice connections.

For example, the servers (103) may include a video conferencing server, etc.

In general, embodiments of the present invention can be used with various communication systems, such as SMS, instant messaging, email, voice, video, etc.

In one embodiment, the user terminals may use different applications to communicate with each other with the help of the communication server(s) (103).

For example, a user of a PDA may use instant messages to communicate with communication server(s) (103), which further relays the communication with another user of a mobile phone through SMS messages.

In one embodiment, the communication server(s) (103) integrates various different types of communication systems, such as email, instant messaging, chat, SMS messaging, voice communication, video teleconferencing, etc. Thus, the user terminals in communication may or may not use the same types of communication applications.

In one embodiment, the server(s) (103) include two types of servers to support communication: connection servers and session servers. Connection servers maintain communication connections (e.g., TCP/IP connections) to a number of users; and session servers maintain user related data for a communication session, such as the presence information and roster of a user, etc. A roster of a user in an IM system typically includes a list of users of the IM system, or other entities, to whom the user is subscribed.

Connection servers are designed to service a large number of simultaneous connections to clients. A connection server can handle any user so that a connection server can be selected to reduce latency to the client. Connection servers do the initial version negotiation, authentication and handshaking for a connection.

For example, in an IM system connection servers parse and canonicalize the original communication stream (e.g., in Extensible Markup Language (XML)) from the user, and protect the service from protocol attacks (e.g., eXtensible Messaging and Presence Protocol (XMPP)).

Once a client has completed the initial handshake to establish a session, connection servers monitor traffic for rate-limiting and parse and print the stream from and to the client.

Connection servers may or may not "short-circuit" packets directly from one user's connection to another user's connection to bypass the session servers, even if two clients are connected on the very same connection server.

Session servers are used to maintain the state for a user's session, enforce privacy policies, broadcast presence, etc.

In one embodiment, the server(s) (103) include one or more servers to monitor the communication traffic for the detection of indications of abuse. When an indication of abuse is detected, a human-in-the-loop challenge is generated and presented to the corresponding user terminal.

In one embodiment, if the answer from the user terminal fails the challenge, it may be determined that the user terminal is under the control of a bot, not a human; and appropriate actions can then be taken to limit the access from the user terminal. For example, the privilege of the user terminal to use the service of the server(s) (103) may be suspended for a period of time.

In one embodiment of the present invention, the server(s) (103) provides human-in-the-loop challenges in a form that is appropriate for the communication connection to the user terminal device. For example, text-based or sound-based challenges can be used for real time communication systems such as IM, VoIP, etc. When appropriated, image-based challenges can also be used.

In one embodiment of the present invention, the user terminal uses an IM client or an SMS client, which may not be able to render image, or rendering an image can dramatically effect the usage flow in the application. Thus, the server automatically selects a non-image format challenge for the user terminal.

Further, the server may monitor the type of communication originated from the user terminal (e.g., a mobile device) that is capable of rendering different type of data (e.g., text, sound, image, video, etc.) to determine an appropriate format.

For example, when the user terminal is in a video conferencing mode, an image-based or video-based challenge may be presented. If the device sends only SMS messages, an SMS message-based challenge is presented.

Alternatively, multiple types of challenges may be sent to the user terminal so that a human user may select one which is appropriate for the situation to response.

In one embodiment of the present invention, the servers(s) (103) includes one or more servers to generate challenges automatically. The challenges may be generated automatically partially according to information stored in the database (e.g., components of questions, rules to composite questions), partially according to information related to the current communication stream, partially based upon information randomly obtained from the Internet, and/or partially based on advertisement information.

For example, the challenge may use an advertisement (e.g., selected according to the relevancy to the content of the ongoing communication of the user terminal) to set up the context and post a question regarding the advertisement.

In one embodiment of the present invention, the human-in-the-loop challenges may or may not be "public" Turing tests. The data for the generation of the challenges may be kept in secrete and may change from time to time to discourage the attempts to develop bots to break the challenges.

Example

Figure 2:
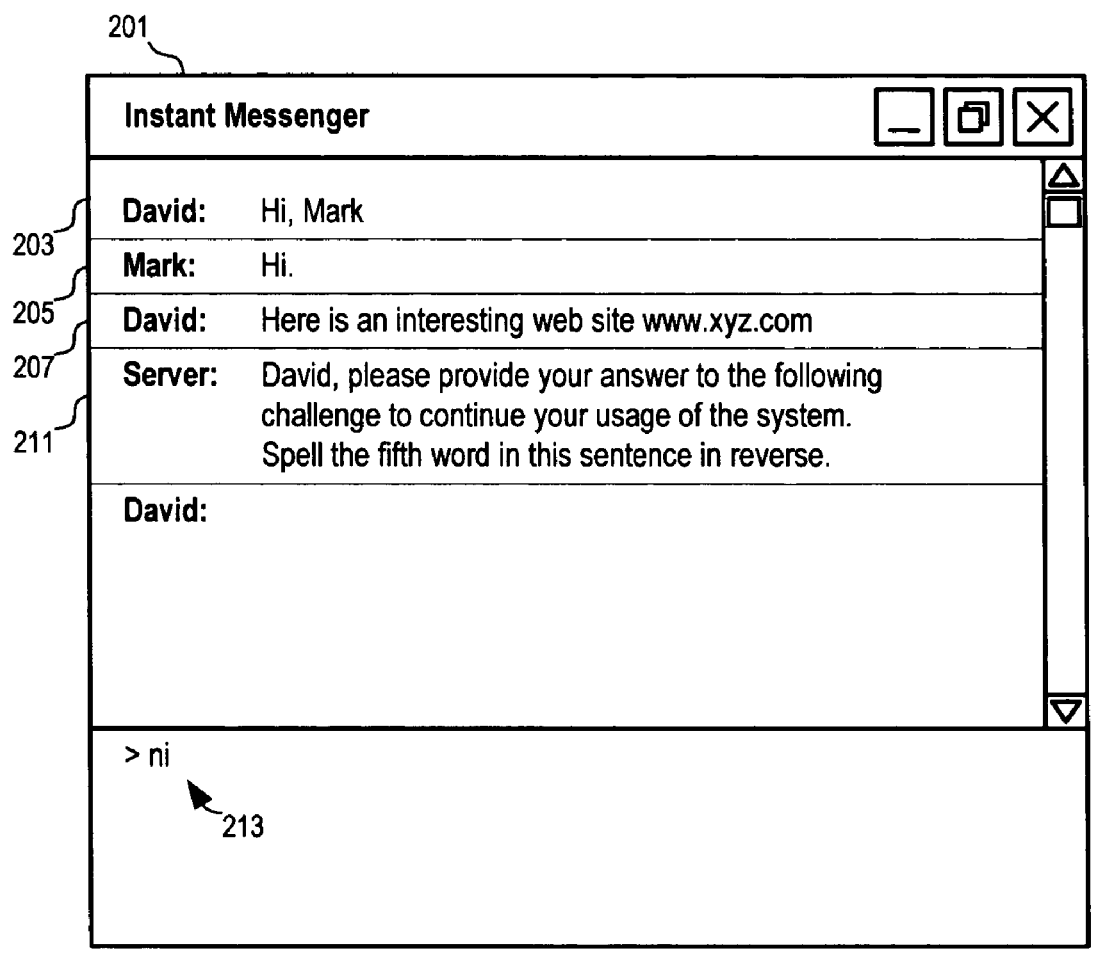
FIGS. 2-3 illustrate scenarios to automatically present challenges to tell humans and machines apart according to embodiments of the present invention.
Figure 3:
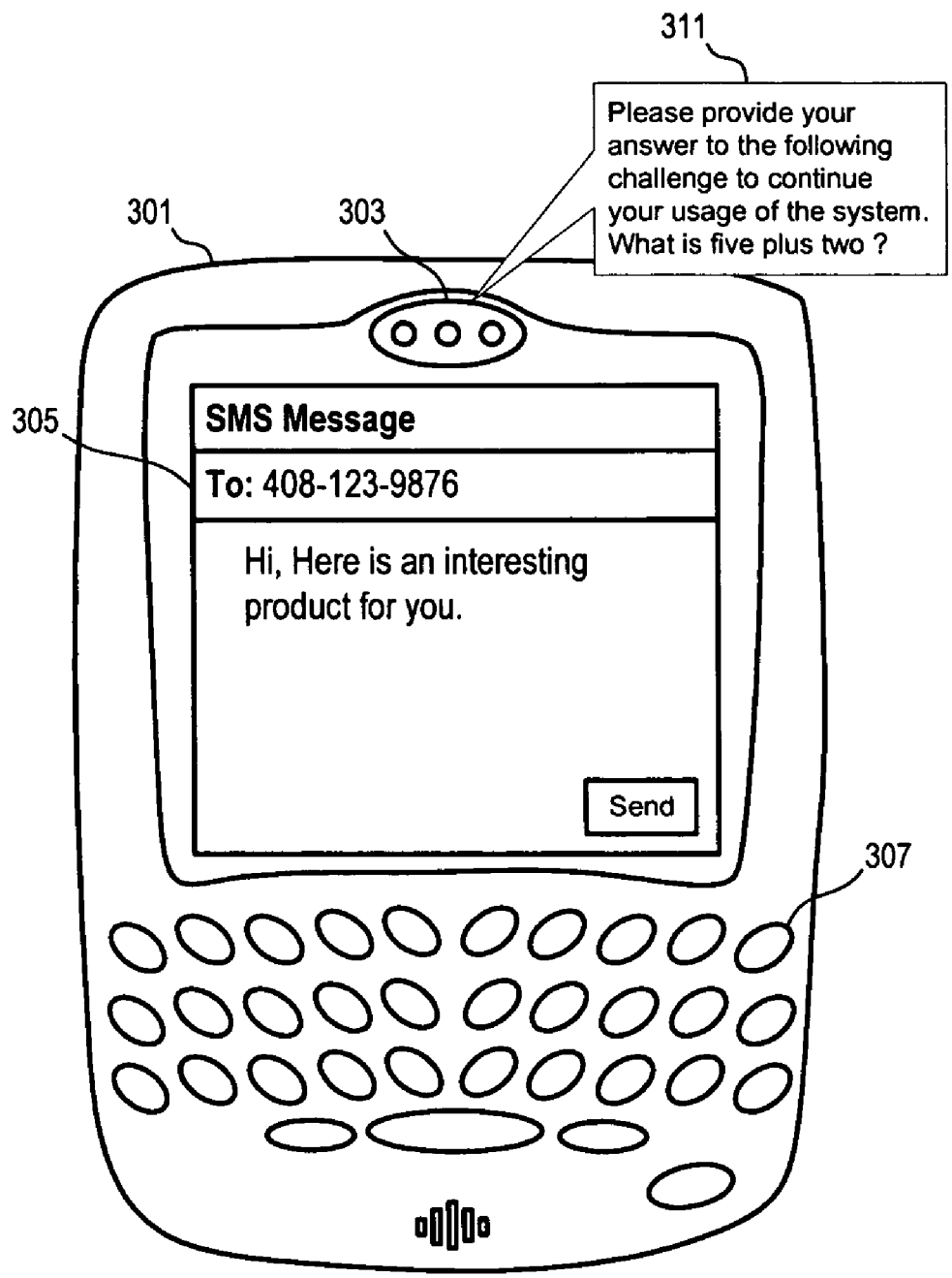

FIGS. 2-3 illustrate scenarios to automatically present challenges to tell humans and machines apart according to embodiments of the present invention.

In one embodiment of the present invention, it is desirable to prevent an IM-based bot to send out unsolicited content to a lot of people. To prevent the abuse of IM-based bots, the server may monitor the traffic for indications of spam. For example, after a configurable amount of traffic that is considered unusual from a human, the server may raise a human-in-the-loop challenge. In such a situation, it may not make sense to show an image-based CAPTCHA™ test. A text- or sound-based challenge is then provided.

In the example of FIG. 2, an Instant Messaging (IM) client (201) is used at the user terminal. The server monitors the usage of the instant messaging system by the user terminal. Through monitoring the conversation (e.g., 201-205), the server may detect an indication that the user terminal may be spamming under control of a software robot (bot).

A number of aspects of the communication traffic can be monitored for indication of spam. For example, a bot may send similar messages to a large number of people; a bot may send messages at a rate must higher than a typical human can type; a bot may send a large amount of data than a typical human would type; spam messages may have certain language patterns, etc.

When an indication of abuse is detected, the server provides a text challenge (211) to request for a correct answer before allowing the continue use of the system.

In the example of FIG. 2, the server posts a request "Spell the fifth word in this sentence in reverse". A human user can understand the request and type in the response "ni" (213). A spam bot will fail to provide a correct answer. Thus, if the server does not receive an answer, the server may determine that the IM client is under the control of a bot and block the IM client from contacting other IM users for a period of time.

In one embodiment, the text-based challenge may be in the form of a question about the context, such as "what is the third word in this sentence", "what is the last word of the previous message you received", etc.

In one embodiment, the text-based challenge may be in the form of a request that require further manipulation of the context, such as "what is the fifth word in this sentence in reverse".

In one embodiment, the text-based challenge may require commonly known knowledge, such as "is New York City in Africa", "are apples squares", etc.

In one embodiment, the text-based challenge is a sentence in a natural language currently used by the IM client, such as English. In one embodiment, a natural language is a language in which human users talk to teach other in voice communications and/or in written communications. A computer may guess the result in a period of time, people can understand it much faster.

In one embodiment, the server deliberately misspells words to confuse bots. Humans typically can spot a misspelling and understand the sentence.

In one embodiment, server may randomly take out vowels (or other characters) to generate the challenge. Further, the characters (e.g., vowels) can also be added randomly. Alternatively, the server may randomly select and substitute one word with another word that has similar spelling.

In one embodiment, the text challenge is generated from a set of components. For example, the context may be "this sentence", "the previous message you received", "the previous message you sent", "this paragraph", "the above advertisement", etc. For example, the question may be about the i'th word, j'th character, n'th sentence, etc.

In one embodiment, the text challenge is in a negative form, such as "not what is a capital of . . . ". In one embodiment, the text challenge is in the form of a puzzle (e.g., a mathematical expression).

In the example of FIG. 3, a handheld device (e.g., a PDA and/or mobile phone) (301) is the user terminal.

For example, similar messages (305) are being sent from the device to many other users in a short period of time, which may be the work of a spam bot or an exciting user who wants to tell friends a story. Thus, it may become desirable to determine whether there is a human at the end of the device.

To tell human and machine apart, the server sends a sound challenge (311); and the device plays the sound through the speaker (303). The sound challenge (311) asks the user "what is five plus two". A human will be able to determine the result and press one or more keys (e.g., 307) to send the correct response.

The sound challenge may be presented as a Multimedia Messaging Service (MMS) message, or as a text-to-speech message played after calling the device (e.g., through VoIP or traditional telephone network), or through other communication channels.

Alternatively, the challenge may be sent as text in the form of an SMS message; and the response is expected from a reply SMS message.

In one embodiment of the present invention, the sound-based challenge includes a sound clip that requests the user to type in the word they just heard. Sound-based challenges are great for visually impaired users. Sound-based challenges also work well with telephonic applications.

In one embodiment, the sound-based challenge may ask the user to perform a simple mathematical operation and provide the result, or ask the user to speak a word, or ask the user to type in a number related to the question, etc.

In general, text-based or sound-based challenges can also be used with other communication clients, such as a VoIP client, a video conferencing client, a document browser, etc.

Figure 4:
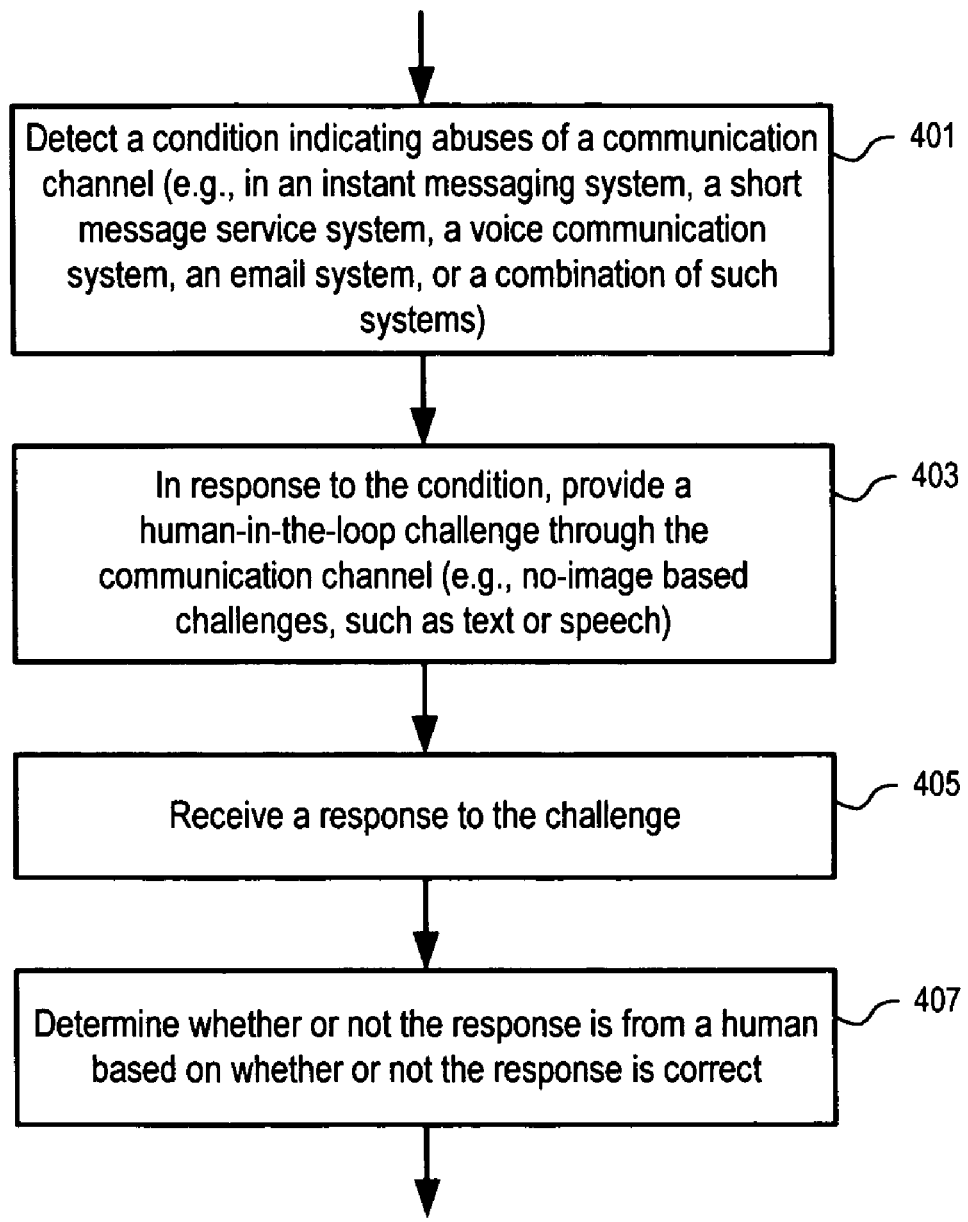
FIGS. 4-5 illustrate methods to present challenges to tell humans and machines apart according to one embodiment of the present invention.
Figure 5:
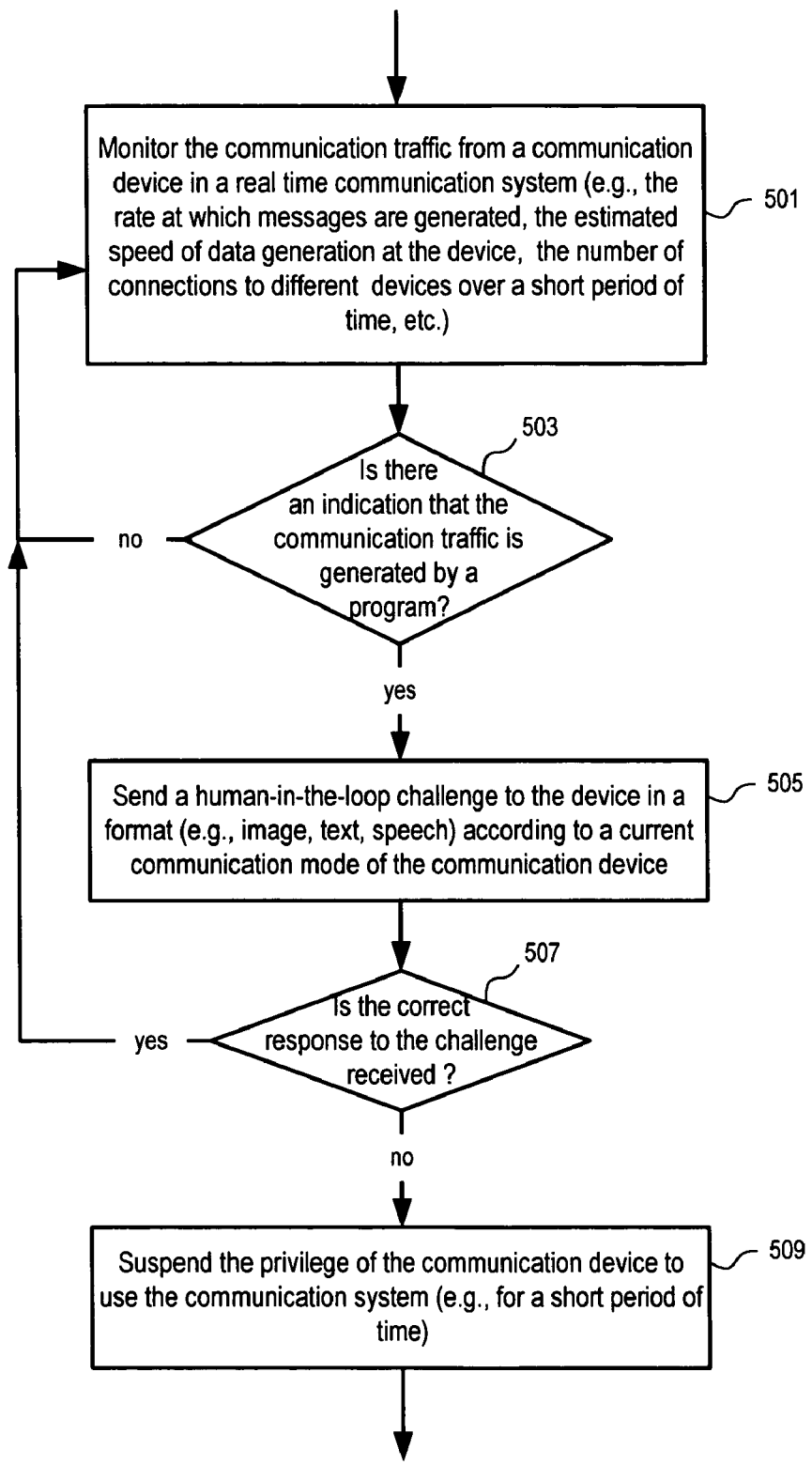

FIGS. 4-5 illustrate methods to present challenges to tell humans and machines apart according to one embodiment of the present invention.

In FIG. 4, a condition indicating abuses of a communication channel is detected (401) (e.g., through monitoring the traffic in the communication channel). The communication channel may be in an instant messaging system, a short message service system, a voice communication system, an email system, or a combination of such systems.

In response to the condition, a human-in-the-loop challenge is provided (403) through the communication channel (e.g., no-image based challenges, such as text or speech). A response to the challenge is subsequently received (405). The system then automatically determines (407) whether or not the response is from a human based on whether or not the response is correct.

In FIG. 5, the system monitors (501) the communication traffic from a communication device in a real time communication system. For indications of bot abuses, the system may monitor the rate at which messages are generated, the estimated speed of data generation at the device, the number of connections to different devices over a short period of time, etc.

If operation 503 determines that there is an indication that a program generates the communication traffic, the system sends (505) a human-in-the-loop challenge to the device in a format (e.g., image, text, speech) according to a current communication mode of the communication device.

If operation 507 determines that the correct response to the challenge is not received (507), the system suspends (509) the privilege of the communication device to use the communication system (e.g., for a short period of time).

Figure 6:
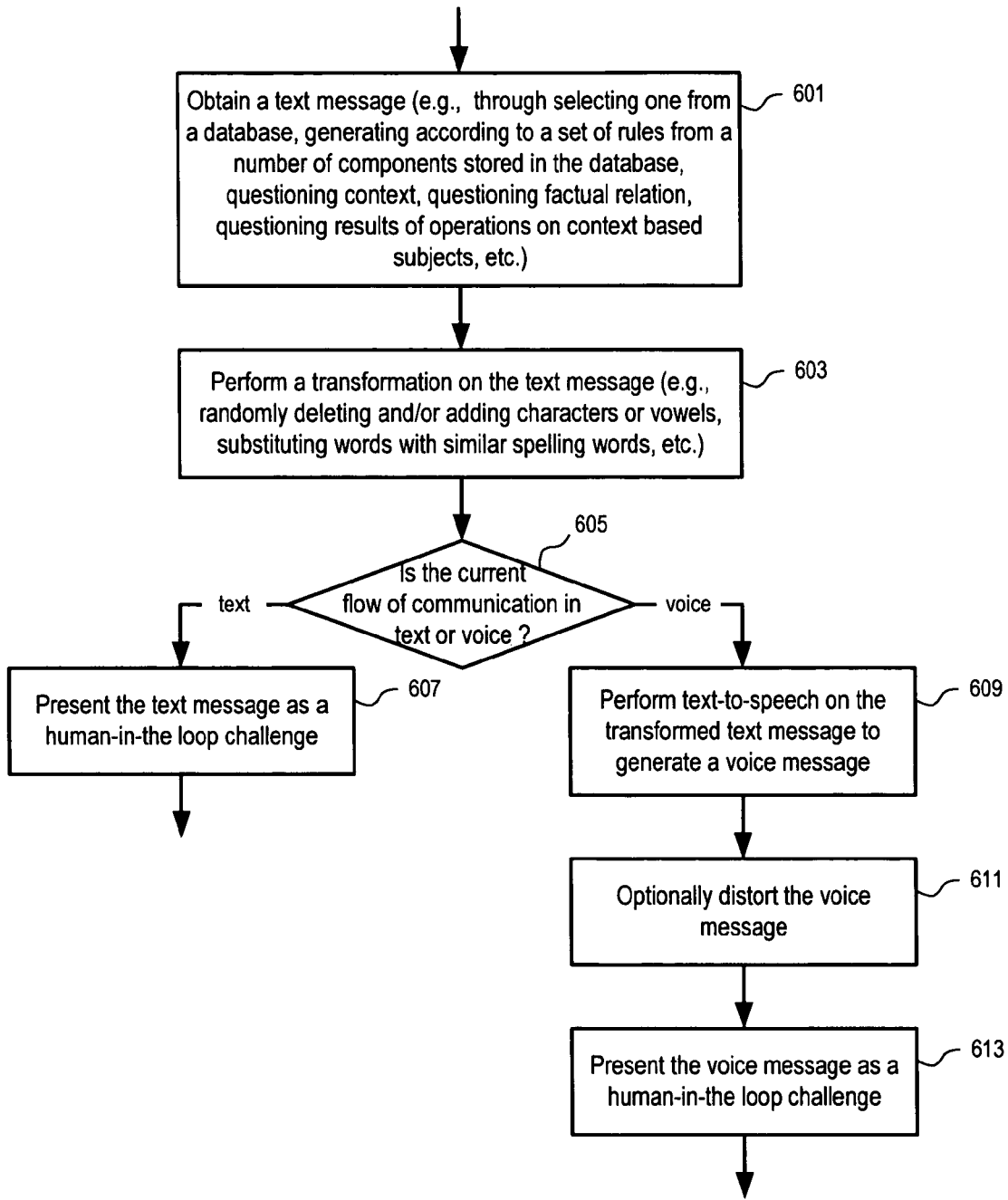
FIG. 6 illustrates a method to generate challenges to tell humans and machines apart according to one embodiment of the present invention.

FIG. 6 illustrates a method to generate challenge to tell humans and machines apart according to one embodiment of the present invention.

After obtaining (601) a text message, a transformation is performed (603) on the text message. The text message may be obtained through selecting one from a database, generating according to a set of rules from a number of components stored in the database, questioning context, questioning factual relation, questioning results of operations on context based subjects, etc. In one embodiment, to provide a correct response to a factual-based challenge, the responder is required to have certain factual knowledge, such as the geographic relation between New York City and Africa, which is not provided with the challenge. For example, the factual-based challenge may test whether or not the responder is aware of the factual knowledge that is commonly known to a typical human user. The transformation of the text message may include randomly deleting and/or adding characters or vowels, substituting words with similar spelling words, etc.

If operation (605) determines that the current flow of communication is in text, the text message is presented as a human-in-the loop challenge.

If operation (605) determines that the current flow of communication is in voice, text-to-speech is performed (609) on the transformed text message to generate a voice message. Optionally, the voice message is further distorted (611) to increase the difficulty for bots to comprehend the message. The voice message is then presented (613) as a human-in-the loop challenge.

The generated human-in-the-loop challenges can be used in real time communication systems, such as IM, telephone conversation, video conferencing, as well as in HTML form submission (e.g., for online registration, comment submission, access control, blocking bots, etc.)

Hardware

Figure 7:
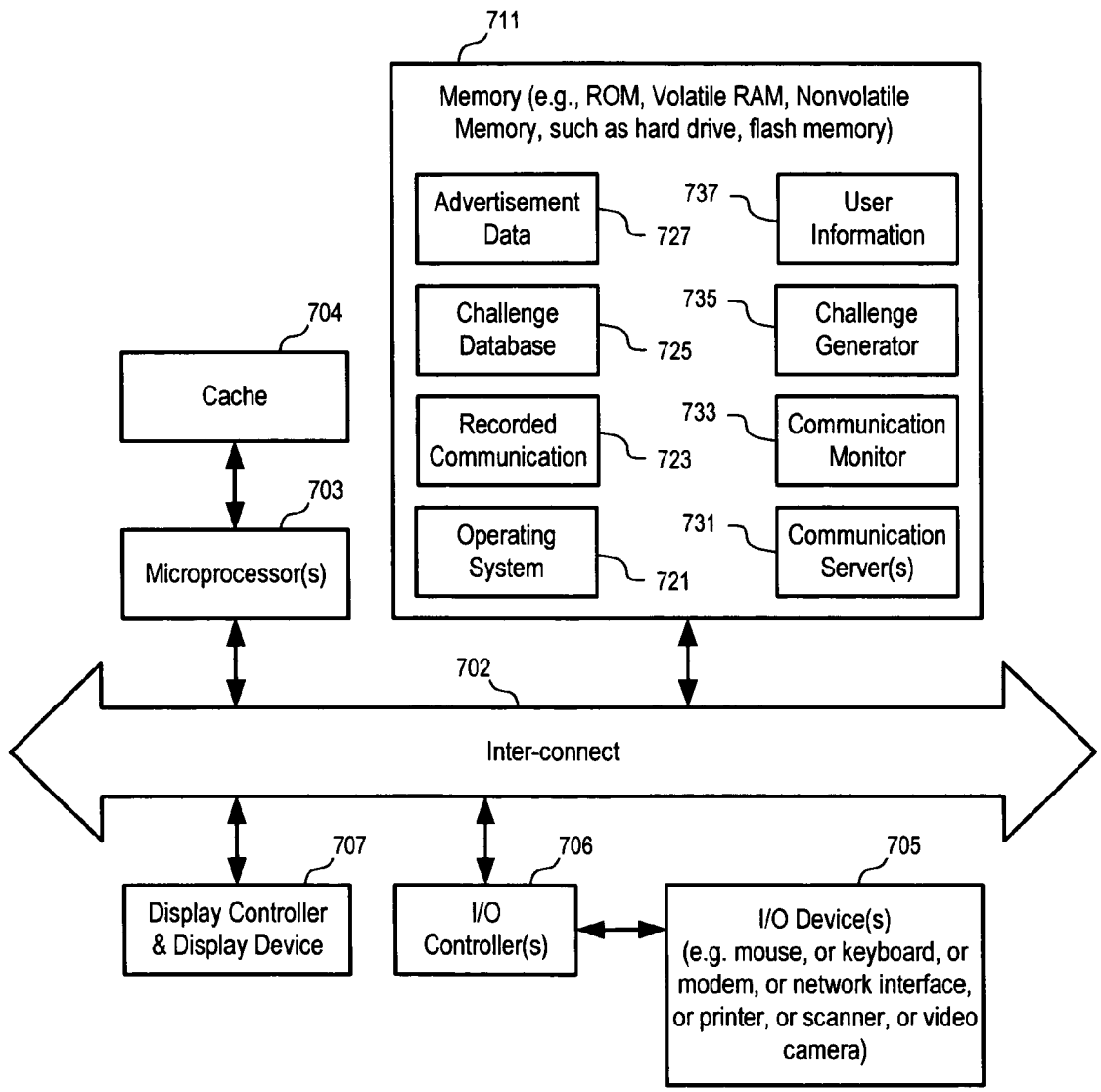
FIG. 7 illustrates a server system to generate and present challenges to tell humans and machines apart according to one embodiment of the present invention.

FIG. 7 illustrates a server system to generate and present challenges to tell humans and machines apart according to one embodiment of the present invention.

While FIG. 7 illustrates various components of a computer system, it is not intended to represent any particular architecture or manner of interconnecting the components. Other systems that have fewer or more components may also be used with the present invention.

In FIG. 7, the communication device (701) is a form of a data processing system. The system (701) includes an inter-connect (702) (e.g., bus and system core logic), which inter-connects a microprocessor(s) (703) and memory (711). The microprocessor (703) is coupled to cache memory (704) in the example of FIG. 7.

The inter-connect (702) interconnects the microprocess(s) (703) and the memory (711) together and also interconnects them to a display controller and display device (707) and to peripheral devices such as input/output (I/O) devices (705) through an input/output controller(s) (706). Typical I/O devices include mice, keyboards, modems, network interfaces, printers, scanners, video cameras and other devices which are well known in the art.

The inter-connect (702) may include one or more buses connected to one another through various bridges, controllers and/or adapters. In one embodiment the I/O controller (706) includes a USB (Universal Serial Bus) adapter for controlling USB peripherals, and/or an IEEE-1394 bus adapter for controlling IEEE-1394 peripherals.

The memory (711) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

The memory (711) stores an operating system (721), communication server(s) (731), communication monitor (733), challenge generator (735) and user information (734). The communication server(s) (731) may include one or more server(s) (103) of FIG. 1.

In one embodiment, the memory (711) further stores recorded communication (723), challenge database (725), advertisement data (727), etc.

In one embodiment, the communication server(s) (731) may record the communication (723) to provide context for the generation of a text message for an instant of human-in-the-loop challenge.

In one embodiment, an advertisement is further selected from the advertisement data (727) by the challenge generator. The selected advertisement is then provided as part of the context of the challenge.

In one embodiment, when the communication monitor (733) detects indications of bots, the challenge generator (735) generates a text message based challenge using at least some of the advertisement data (727), challenge database (725), recorded communication (723) for the corresponding user terminal. The text message can then be presented as in a text format or a sound format for a response.

FIG. 7 shows a server data processing system according to one embodiment of the present invention.

Further, a user terminal as a client system can be a data processing system similar to the system of FIG. 7. A client system can be in the form of a PDA, a cellular phone, a notebook computer or a personal desktop computer. A typical client system does not have challenge database, communication monitor, challenge generator, and communication server(s), etc. A client system may have other additional components. A typical client system has communication client(s) for emails, instant messages, SMS messages and/or telephonic applications, etc.

Alternatively, the traditional communication client(s) may be used in some embodiments of the present invention.

General

The present invention is illustrated by way of example and not limitation in the figures of the accompanying drawings in which like references indicate similar elements.

A "document" as used herein broadly refers to various items, such as files, directories, or other data or information that may be stored, received, sent, created or otherwise processed by one or more computing devices. For example, a document may include any file created on a computing system. The term file as used herein includes a collection of bytes or bits stored as an individual entity. For example, a file may be a binary file, a text file, or a combination thereof, such as a word processor file, a data file, a spreadsheet, a workbook, an image, a drawing, an audio file, a video file, an audio/visual file, a multimedia file, an archive file, a batch file, a source file, an object file, or an executable program. The term file may also refer to a file system object which is accessed as though the object were a file. A document may be linked to one or more other documents, such as via a hyperlink. A document may include a web page, such as a file coded in a markup language (e.g. hypertext markup language (HTML) or extensible markup language (XML)), a file coded in a scripting language (e.g. JavaScript, Active Server Pages (ASP), or Perl), or a file viewed in a web browser (e.g. a portable document format (PDF), an image file or text file). A document may reside on a single system, or may be accessed by one or more systems via a network, e.g. an Intranet or the Internet.

The description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as a microprocessor.

A machine readable medium can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.).

For example, a machine readable medium includes recordable/non-recordable media, such as read only memory (ROM), random access memory (RAM), magnetic disk storage media, optical storage media, flash memory devices, etc., as well as electrical, optical, acoustical or other forms of propagated signals, such as carrier waves, infrared signals, digital signals, etc.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The present invention includes methods and apparatuses which perform these methods, including data processing systems which perform these methods, and computer readable media which when executed on data processing systems cause the systems to perform these methods.

The foregoing description, for purpose of explanation, has been described with reference to various embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method performed by a data processing system, comprising:

detecting, with a processor, a condition indicative of abuses of a communication channel;

in response to the condition, providing, with the processor, a challenge through the communication channel, the challenge being solvable to human user of the communication channel, wherein the challenge is based on position of content within in a message;

receiving, with the processor, a response to the challenge; and determining, with the processor, whether or not the response is correct.

2. The method of claim 1, wherein the communication channel is primarily for one of:

voice communications; and text communications.

3. The method of claim 1, wherein the communication channel is for one of:

instant messaging;

short message service (SMS) messaging;

telephonic conversation; and video conferencing.

4. The method of claim 1, wherein the message is one of:

factual based; and instructive of an operation in a natural language to obtain a result.

5. The method of claim 4, further comprising:
generating the challenge through randomly eliminating one or more characters.

6. The method of claim 5, further comprising:
randomly eliminating one or more vowels to generate the challenge.

7. The method of claim 4, further comprising:
generating the challenge through randomly adding one or more characters.

8. The method of claim 4, further comprising:
replacing a first word with a second word that has spelling similar to the first word to generate the challenge.

9. The method of claim 1, further comprising:
generating the challenge through misspelling of the message.

10. The method of claim 1, wherein the challenge includes a sound clip.

11. The method of claim 10, further comprising:
generating the sound clip from a text-based challenge.

12. The method of claim 11, wherein the sound clip comprises a puzzle.

13. The method of claim 12, wherein the puzzle asks for a result of a mathematical expression.

14. The method of claim 1, further comprising:
monitoring traffic on the communication channel to detect the condition.

15. The method of claim 14, wherein the condition includes an amount of traffic exceeding a threshold.

16. The method of claim 14, wherein the condition includes a speed of messages transmitted through the communication channel exceeding a threshold.

17. The method of claim 1, wherein the message is in the form of a question.

18. The method of claim 1, wherein a solution to the challenge includes a non-random manipulation of the word of the plurality of words in the message.

19. The method of claim 1, wherein a solution to the challenge includes a manipulation of an external textual component that is relative to a position of the text message.

20. The method of claim 19, wherein the manipulation of the external textual component includes a transformation of a word within the external textual component.

21. A non-transitory machine readable storage medium containing instructions stored therein, which when executed causes a machine to perform a method, comprising:
detecting a condition indicative of abuses of a communication channel;
in response to the condition, providing a challenge through the communication channel, the challenge being solvable to human user of the communication channel, wherein the challenge is based on position of content within in a message;
receiving a response to the challenge; and
determining whether or not the response is correct.

22. A data processing system, comprising:
a processor;
a memory;
means for detecting a condition indicative of abuses of a communication channel;
means for, in response to the condition, providing a challenge through the communication channel, the challenge being solvable to human user of the communication channel, wherein the challenge is based on position of content within in a message;
means for receiving a response to the challenge; and
means for determining whether or not the response is correct.

23. A method performed by a data processing system, comprising:
detecting, with a processor, a condition indicative of abuses of a communication channel primarily for voice and/or text communications;
in response to the condition:
obtaining, with the processor, a text message;
transforming, with the processor, the text message to generate misspelling;
providing, with the processor, a text message in a non-image format in a challenge through the communication channel, the challenge being solvable to an human user of the communication channel and being based on identifying the misspelling;
receiving, with the processor, a response to the challenge; and
determining, with the processor, whether or not the response is correct.

24. A method performed by a data processing system, comprising:
detecting, with a processor, a condition indicative of abuses of a communication channel;
in response to the condition, providing, with the processor, a challenge through the communication channel, wherein the challenge is based on position of content within in a message;
receiving, with the processor, a response to the challenge; and
determining, with the processor, whether or not the response is correct.

25. The method of claim 24, wherein the challenge is configured to prevent machine understandability.

26. A method performed by a data processing system, comprising:
detecting, with a processor, a condition indicative of abuses of a communication channel;
in response to the condition, providing, with the processor, a challenge through the communication channel, the challenge being solvable to a human user of the communication channel, wherein the challenge is based on identifying a misspelling in the message;
receiving, with the processor, a response to the challenge; and
determining, with the processor, whether or not the response is correct.

27. A method performed by a data processing system, comprising:
detecting, with a processor, a condition indicative of abuses of a communication channel;
in response to the condition, providing, with the processor, a challenge through the communication channel, the challenge being solvable to a human user of the communication channel, wherein the challenge is based on solving a mathematical problem;
receiving, with the processor, a response to the challenge; and
determining, with the processor, whether or not the response is correct.

28. A non-transitory machine readable storage medium containing instructions stored therein, which when executed causes a machine to perform a method, comprising:
detecting a condition indicative of abuses of a communication channel;
in response to the condition, providing a challenge through the communication channel, the challenge being solvable to a human user of the communication channel, wherein the challenge is based on identifying a misspelling in the message;

receiving a response to the challenge; and determining whether or not the response is correct.

29. A non-transitory machine readable storage medium containing instructions stored therein, which when executed causes a machine to perform a method, comprising:

detecting a condition indicative of abuses of a communication channel;

in response to the condition, providing a challenge through the communication channel, the challenge being solvable to a human user of the communication channel, wherein the challenge is based on solving a mathematical problem;

receiving a response to the challenge; and determining whether or not the response is correct.

30. A data processing system, comprising:

a processor;

a memory;

means for detecting a condition indicative of abuses of a communication channel;

means for, in response to the condition, providing a challenge through the communication channel, the challenge being solvable to a human user of the communication channel, wherein the challenge is based on identifying a misspelling in the message;

means for receiving a response to the challenge; and means for determining whether or not the response is correct.

31. A data processing system, comprising:

a processor;

a memory;

means for detecting a condition indicative of abuses of a communication channel;

means for, in response to the condition, providing a challenge through the communication channel, the challenge being solvable to a human user of the communication channel, wherein the challenge is based on solving a mathematical problem;

means for receiving a response to the challenge; and means for determining whether or not the response is correct.

32. A method performed by a data processing system, comprising:

detecting, with a processor, a condition indicative of abuses of a communication channel;

in response to the condition, providing, with the processor, a challenge through the communication channel, wherein the challenge is based on identifying a misspelling in the message;

receiving, with the processor, a response to the challenge; and determining, with the processor, whether or not the response is correct.

33. A method performed by a data processing system, comprising:

detecting, with a processor, a condition indicative of abuses of a communication channel;

in response to the condition, providing, with the processor, a challenge through the communication channel, wherein the challenge is based on solving a mathematical problem;

receiving, with the processor, a response to the challenge; and determining, with the processor, whether or not the response is correct.

\* \* \* \* \*